(12) United States Patent
Liu et al.

(10) Patent No.: US 10,747,270 B2
(45) Date of Patent: Aug. 18, 2020

(54) INPUT APPARATUS, INFORMATION PROCESSING METHOD, AND INFORMATION PROCESSING APPARATUS

(71) Applicants: Beijing Lenovo Software Ltd., Beijing (CN); Lenovo (Beijing) Co., Ltd., Beijing (CN)

(72) Inventors: Qing Liu, Beijing (CN); Jinping Yang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 226 days.

(21) Appl. No.: 15/794,415

(22) Filed: Oct. 26, 2017

(65) Prior Publication Data

US 2018/0046224 A1 Feb. 15, 2018

Related U.S. Application Data

(63) Continuation of application No. 14/228,906, filed on Mar. 28, 2014, now abandoned.

(30) Foreign Application Priority Data

Sep. 18, 2013 (CN) .......................... 2013 1 0430615

(51) Int. Cl.
*G06F 1/16* (2006.01)
*G06F 3/023* (2006.01)
*G06F 3/0488* (2013.01)

(52) U.S. Cl.
CPC .......... *G06F 1/1662* (2013.01); *G06F 3/0238* (2013.01); *G06F 3/04886* (2013.01)

(58) Field of Classification Search
CPC .... G06F 3/04886; G06F 3/0426; G06F 3/044; G06F 3/0412; G06F 3/02–027;
(Continued)

(56) References Cited

U.S. PATENT DOCUMENTS

2006/0103632 A1 5/2006 Bourdelais et al.
2006/0284858 A1 12/2006 Rekimoto
(Continued)

FOREIGN PATENT DOCUMENTS

CN 101498979 A 8/2009
CN 102004573 A 4/2011
(Continued)

OTHER PUBLICATIONS

Second Chinese Office Action regarding Application No. 201310430615.3 dated Aug. 2, 2017. English translation summary provided by Unitalen Attorneys at Law.
(Continued)

*Primary Examiner* — Temesghen Ghebretinsae
*Assistant Examiner* — Ivelisse Martinez Quiles
(74) *Attorney, Agent, or Firm* — Harness, Dickey & Pierce, P.L.C.

(57) ABSTRACT

An input apparatus, an information processing method, and an information processing apparatus are provided. The input apparatus includes a protection surface layer, and a sensing array through which an operation of a user on the protection surface layer can be determined. The information processing method can parse trigger information sent by the input apparatus for its corresponding parameter information and further switch the touchable keyboard to a first input mode or a second input mode according to the obtained parameter information. The information processing method and apparatus and the electronic device activate a keyboard to judge the demand of the user automatically in response to the trigger information entered by the user and further control switching of the input mode of the keyboard in response to the demand of the user.

10 Claims, 4 Drawing Sheets

(58) Field of Classification Search
CPC ......... G06F 2203/04105; G06F 1/1662; G06F 3/0238; G06F 2203/04809
See application file for complete search history.

(56) References Cited

U.S. PATENT DOCUMENTS

| | | | | |
|---|---|---|---|---|
| 2009/0309616 | A1* | 12/2009 | Klinghult | G06F 3/044 324/686 |
| 2010/0039393 | A1* | 2/2010 | Pratt | G06F 3/0236 345/173 |
| 2011/0050628 | A1* | 3/2011 | Homma | G06F 3/04886 345/174 |
| 2011/0057899 | A1* | 3/2011 | Sleeman | G01L 1/146 345/174 |
| 2011/0057903 | A1* | 3/2011 | Yamano | G06F 3/04886 345/174 |
| 2011/0084924 | A1 | 4/2011 | Chang et al. | |
| 2012/0019444 | A1* | 1/2012 | Huang | G06F 3/0202 345/168 |
| 2012/0306755 | A1* | 12/2012 | Lin | G06F 3/04886 345/168 |
| 2012/0306756 | A1* | 12/2012 | Lin | G06F 3/04886 345/168 |
| 2013/0002561 | A1* | 1/2013 | Wakasa | G06F 3/04886 345/168 |
| 2013/0018489 | A1 | 1/2013 | Grunthaner et al. | |
| 2013/0044059 | A1 | 2/2013 | Fu | |
| 2013/0050095 | A1* | 2/2013 | Nakajima | G06F 3/0202 345/168 |
| 2013/0076646 | A1* | 3/2013 | Krah | G06F 3/0414 345/173 |
| 2013/0106699 | A1* | 5/2013 | Babatunde | G06F 3/04886 345/168 |
| 2013/0106700 | A1* | 5/2013 | Sugiura | G06F 3/04886 345/168 |
| 2013/0215035 | A1 | 8/2013 | Guard | |
| 2013/0228023 | A1* | 9/2013 | Drasnin | G06F 1/1618 73/862.541 |
| 2013/0229380 | A1* | 9/2013 | Lutz, III | G06F 1/1618 345/174 |
| 2014/0267128 | A1 | 9/2014 | Bulea et al. | |
| 2014/0347573 | A1 | 11/2014 | Mockarram-Dorri | |

FOREIGN PATENT DOCUMENTS

| | | |
|---|---|---|
| CN | 202995638 U | 6/2013 |
| CN | 203178925 U | 9/2013 |
| WO | WO-2014046492 A2 | 3/2014 |

OTHER PUBLICATIONS

First Chinese Office Action regarding Application No. 201310430615.3 dated Dec. 28, 2016. English translation provided by Unitalen Attorneys at Law.

* cited by examiner

INPUT APPARATUS, INFORMATION PROCESSING METHOD, AND INFORMATION PROCESSING APPARATUS

This application is a continuation of U.S. patent application Ser. No. 14/228,906 filed on Mar. 28, 2014. This application claims the priority to Chinese Patent Application No. 201310430615.3, entitled "INPUT APPARATUS, INFORMATION PROCESSING METHOD, INFORMATION PROCESSING APPARATUS AND ELECTRONIC DEVICE", filed with the Chinese Patent Office on Sep. 18, 2013. The entire disclosures of each of the above applications are incorporated herein by reference.

FIELD OF TECHNOLOGY

The present application relates to the field of communications and in particular to an input apparatus, an information processing method, and an information processing apparatus.

BACKGROUND

A keyboard which is one of traditional input apparatus has emerged in an increasing number of forms and with an increasing number of functions in recent years along with the development of sciences and technologies.

A development trend for a keyboard of a notebook computer is its integration and miniaturization. In the prior art, there is such an ultra-thin keyboard that the thickness of the ultra-thin keyboard is greatly lowered as compared with a traditional keyboard, but the ultra-thin keyboard still fails to satisfy requirements of users today on integration and miniaturization of an electronic device. Moreover a notebook with a display screen that can be rotated by 360 degrees has emerged in the market, and this requires a keyboard of the notebook to have such characteristics as being well waterproof, dust-proof, easy to handle and capable of automatic recognition of a user demand, but the ultra-thin keyboard in the prior art is absent from these characteristics.

SUMMARY

In view of this, the application provides an input apparatus, an information processing method, an information processing apparatus and an electronic device so as to provide a waterproof and dust-proof ultra-thin keyboard which is capable of controlling automatically a keyboard input mode to be enabled and disabled in response to a user demand to thereby greatly facilitate the use by a user.

In order to attain the foregoing object, the application provides the following technical solutions.

An input apparatus includes:
a protection surface layer configured to protect an internal structure of the input apparatus, wherein the protection surface layer includes a first surface at a first height and a second surface at a second height, and the first height is higher than the second height;
a sensing array, located below the protection surface layer, and configured to determine an operation of a user on the first surface and to generate first information; and
a processing unit configured to process the first information generated by the sensing array.

Optionally the sensing array includes a capacitive touch sensing layer.

Optionally the sensing array includes a first sensing layer and a second sensing layer, and a height of the first sensing layer is higher than a height of the second sensing layer.

Optionally the first sensing layer is a touch sensing layer configured to generate touch sensing information according to a location of the operation of the user on the first surface; and the second sensing layer is a pressure sensing layer configured to generate pressure sensing information according to a pressure of the operation of the user on the first surface.

Optionally the processing unit is further configured to process the pressure sensing information generated by the pressure sensing layer to obtain a pressure value of the operation of the user on the first surface.

An information processing method, applicable to an electronic device with a touchable keyboard, includes:
receiving trigger information sent by an input apparatus;
parsing the trigger information for parameter information of the touch information; and
switching the touchable keyboard to a first input mode or a second input mode according to the parameter information.

Optionally the trigger information is touch information, and the parameter information includes:
touch location information, a pressure value, a pressure duration and/or a pressure increment/decrement rate.

Optionally after the switching the touchable keyboard to the first input mode or the second input mode according to the parameter information, the method further include:
sending the touch location information among the parameter information to a processor, wherein the processor responds to the trigger information according to a current application scenario.

Optionally the switching the touchable keyboard to the first input mode or the second input mode according to the parameter information include:
switching the touchable keyboard to the first input mode, in the case that among the parameter information, a pressure value is larger than a first preset threshold, a pressure duration is smaller than a second preset threshold, and a pressure increment/decrement rate is smaller than a third preset threshold; or
switching the touchable keyboard to the second input mode, in the case that among the parameter information, a pressure value is smaller than a first preset threshold, a pressure duration is larger than a second preset threshold, and a pressure increment/decrement rate is larger than a third preset threshold.

Optionally the switching the touchable keyboard to the first input mode or the second input mode according to the parameter information include:
switching the touchable keyboard to the first input mode, in the case that a pressure duration among the parameter information is smaller than a preset threshold; or
switching the touchable keyboard to the second input mode, in the case that the pressure duration among the parameter information is larger than the preset threshold.

An information processing apparatus, applicable to an electronic device with a touchable keyboard, includes:
an information reception module configured to receive trigger information sent by an input apparatus;
an information parsing module configured to parse the trigger information for parameter information of the touch information; and
a mode control module configured to switch the touchable keyboard to a first input mode or a second input mode according to the parameter information.

Optionally the trigger information is touch information, and the parameter information includes:

touch location information, a pressure value, a pressure duration and/or a pressure increment/decrement rate.

Optionally the mode control module includes:

a first mode switching module configured to activate a key input mode in the case that among the parameter information, a pressure value is larger than a first preset threshold, a pressure duration is smaller than a second preset threshold, and a pressure increment/decrement rate is smaller than a third preset threshold; or a second mode switching module configured to inactivate a key input mode in the case that among the parameter information, a pressure value is larger than a first preset threshold, a pressure duration is larger than a second preset threshold, and a pressure increment/decrement rate is larger than a third preset threshold.

An electronic device with a touchable keyboard includes the information processing apparatus described above.

As can be apparent from the foregoing technical solutions, in comparison with the prior art, the embodiments of the application disclose an input apparatus, an information processing method, an information processing apparatus and an electronic device. The input apparatus includes a protection surface layer and thus has such characteristics of being well waterproof, dust-proof and easy to handle. The input apparatus includes a sensing array through which an operation of a user on the protection surface layer can be determined, and further a demand of the user can be judged according to a result of processing by a processing unit. The information processing method can parse trigger information sent by the input apparatus into corresponding parameter information and further switch the input apparatus to a first input mode or a second input mode according to the obtained parameter information. The information processing method, the information processing apparatus and the electronic device enable a keyboard to judge the demand of the user automatically in response to the trigger information entered by the user and further control switching of the input mode of the keyboard in response to the demand of the user, thus greatly facilitating the use by the user and optimizing an experience of use by the user.

BRIEF DESCRIPTION OF THE DRAWINGS

In order to describe more clearly the technical solutions in the embodiments of the application or in the prior art, the drawings to be used in the description of the embodiments or the prior art will be described briefly, and obviously the drawings in the following description are illustrative of only some embodiments of the application, and those ordinarily skilled in the art can derive from these drawings other drawings without any inventive effort. In the drawings.

DETAILED DESCRIPTION OF THE EMBODIMENTS

The technical solutions in the embodiments of the application will be described below clearly and fully with reference to the drawings in the embodiments of the application, and apparently the described embodiments are only a part but not all of the embodiments of the application. Based upon the embodiments of the application, all the other embodiments derived by those ordinarily skilled in the art without any inventive effort shall come into the scope of the application.

Figure 1:
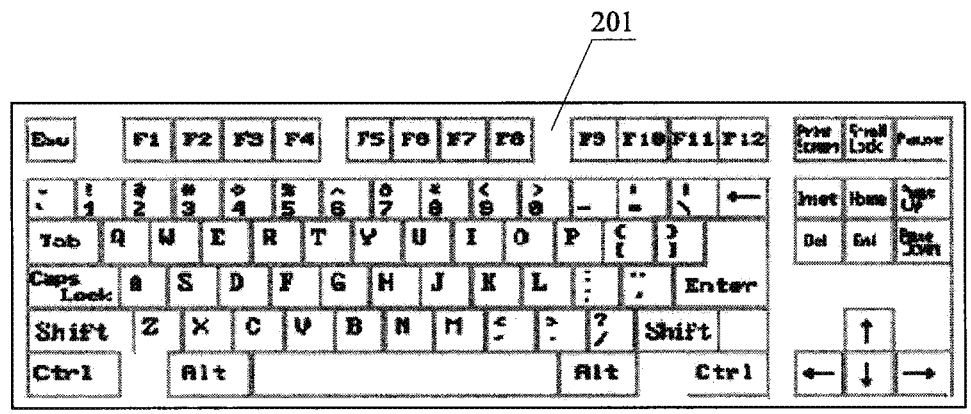
FIG. 1 is a top view of an input apparatus according to an embodiment of the application.
Figure 2:
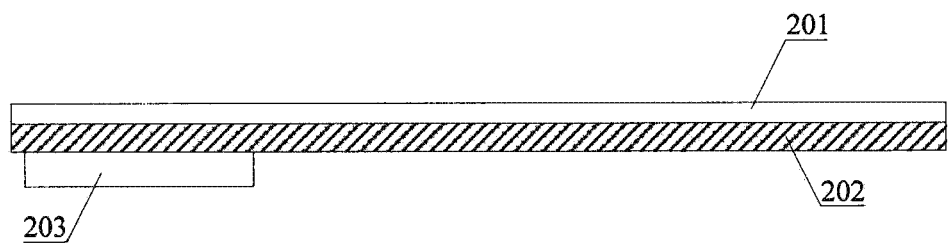
FIG. 2 is a schematic structural diagram of a side view of an input apparatus according to an embodiment of the application.

FIG. 1 is a top view of an input apparatus according to an embodiment of the application, and FIG. 2 is a schematic structural diagram of a side view of an input apparatus disclosed according to an embodiment of the application. Referring to FIG. 1 and FIG. 2, the input apparatus 20 can include: a protection surface layer 201, a sensing array 202, and a processing unit 203.

The protection surface layer 201 is configured to protect an internal structure of the input apparatus, and the protection surface layer includes a first surface at a first height and a second surface at a second height, where the first height is higher than the second height.

The protection surface layer can be a glass plate with a good light transmission and with well characteristics of waterproof and dust-proof. The glass plate is also easily cleaned after being besmirched.

The first surface may be a surface on the outermost side (at the topmost) of the protection surface layer 201, and the second surface may be a surface of a depressed part of the first surface, which is adapted to indicate and distinguish respective key characters of the input apparatus. Such a depressed design of the key characters can indicate the locations of the respective keys and also greatly lower the thickness of the entire input apparatus as compared with the elastically protruding design of key characters in the prior art.

The sensing array 202 is located below the protection surface layer, and is configured to determine an operation of a user on the first surface and to generate first information.

In an illustrative example, the sensing array 202 may include a capacitive touch sensing layer which is functionally similar to a capacitive touch sensing unit in the prior art. The sensing array 202 is adapted to determine a location where the user touches a touchable screen. The capacitive touch sensing layer may particularly be a capacitive touch film.

In another illustrative example, the sensing array 202 may include a first sensing layer and a second sensing layer. A height of the first sensing layer may be higher than a height of the second sensing layer. The first sensing layer may be a touch sensing layer configured to generate touch sensing information according to a location of the operation of the user on the first surface. The second sensing layer may be a pressure sensing layer configured to generate pressure sensing information according to a pressure of the operation of the user on the first surface. The height of the first sensing layer is set above the height of the second sensing layer, that is, the first sensing layer is set between the protection surface layer and the second sensing layer, in order to ensure that the touch sensing layer can recognize accurately a touch operation of the user on the protection surface layer and generate corresponding touch sensing information. In this example, the sensing array may include a capacitive touch film and a pressure sensor; a pressure sensing thin film; or a resistive sensing thin film. The pressure sensor may be a resistive pressure sensing thin film distributed uniformly below the capacitive touch film; or a resistive sensor arranged discretely around the capacitive touch film, both of which base their pressure testing principle upon deformation of the first surface to detect a resistance value on the pressure sensing thin film or the resistive sensor and to determine a pressure on the first surface according to a known calculation relationship of the pressure sensing thin film or the resistive sensor.

The processing unit 203 is configured to process the first information generated by the sensing array.

The processing unit 203 may be particularly configured to process the pressure sensing information generated by the pressure sensing layer to obtain a pressure value of the operation of the user on the first surface. Furthermore, the processing unit 203 may judge a user intention according to the obtained operation pressure value and a preset rule; and perform a corresponding operation. Of course, information processed by the processing unit may further include the touch sensing information generated by the touch sensing layer. Touch sensing technologies in the prior art have already their developed applications in various touch screens, a detailed description of a touch sensing process will be omitted in this embodiment.

In this embodiment, the input apparatus includes the protection surface layer and thus has such characteristics of being well waterproof, dust-proof and easy to handle. The input apparatus includes the sensing array through which an operation of the user on the protection surface layer can be determined. A demand of the user can be judged from the information generated by the sensing array. Further, an input mode of a keyboard can be controlled to be switched in response to the demand of the user, thereby greatly facilitating the use by the user and optimizing an experience of use by the user.

In another embodiment, after obtaining the pressure value of the operation of the user on the first surface, the processing unit may further determine a responding operation to be fed back to the user, according to the pressure value of the operation. For example, the input apparatus may further include a judgment unit configured to compare the pressure value of the operation with a preset value; generate an instruction to alert the user of whether to perform an input operation, in the case that the operation pressure value is smaller than the preset value; and generate directly an instruction to switch the input mode of the keyboard in the case that the operation pressure value is larger than or equal to the preset value.

As well known, an existing keyboard includes combinational function keys. A combination function key can perform an explicit function and an implicit function. The direction function refers to that a fixed character can be entered when the combination function key is triggered explicitly. The implicit function refers to that firstly the Shift key is triggered and then the combination function key is triggered while keeping the Shift key triggered, so as to enter another fixed symbol. Digit keys and some character keys in a major keypad on a conventional physical keyboard can be appreciated as such combinational function keys. In another example, when the user triggers a combinational function key, the judgment unit in the input apparatus can display the fixed character corresponding to the explicit function of the combinational function key directly on the input apparatus upon judging that the operation pressure value is below the preset value; and display the fixed character corresponding to the implicit function of the combinational function key on the input apparatus upon judging the operation pressure value is above or at the preset value.

Of course, after obtaining the pressure value of the operation of the user on the first surface, the processing unit may determine a responding operation to be fed back to the user according to the pressure value of the operation of the user on the first surface, particularly as desirable to a demand of the user.

Figure 3:
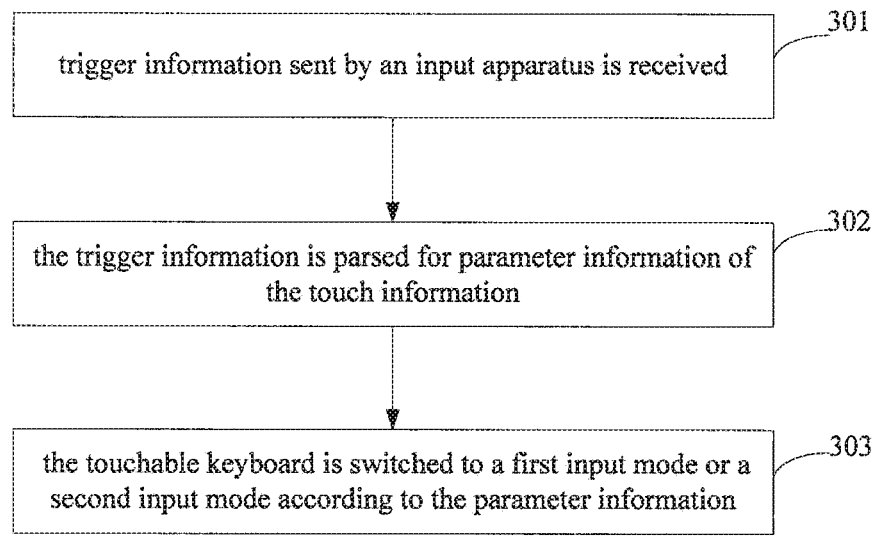
FIG. 3 is a flow chart of an information processing method according to an embodiment of the application.

FIG. 3 is a flow chart of an information processing method according to an embodiment of the application. The information processing method is applicable to an electronic device with a touchable keyboard. Referring to FIG. 3, the information processing method can include steps 301-303.

In step 301, Trigger information sent by an input apparatus is received.

The trigger information is generated by a sensing unit in the touchable keyboard in response to a detected operation of a user on the touchable keyboard. The sensing unit may include but will not be limited to a touch sensing unit and/or a pressure sensing unit.

In step 302, the trigger information is parsed for parameter information of the touch information.

The parameter information may include but will not be limited to touch location information, a pressure value, a pressure duration and/or pressure increment/decrement rate.

In general, the user performing a normal input operation or trigger operation will touch one or more keys at a high rate. That is, a finger will touch a key rapidly and lift up rapidly from the key. In this case, the pressure increment/decrement rate among the parameter information will be high. If the user touches a key on the input apparatus while handling the input apparatus, then he or she will lift up his or her hand for a long period of time or slowly, and at this time the pressure increment/decrement rate among the parameter information will be low. Thus in this embodiment, the pressure increment/decrement rate can also be a criterion to decide the input mode to be switched.

In step 303, the touchable keyboard is switched to a first input mode or a second input mode according to the parameter information.

The first input mode may be a conventional keyboard input mode. The second input mode may be a keyboard input mode without any response, that is, no respond to any operation triggered by the user on the input apparatus. Alternatively, the second input mode can be a keyboard input mode with a response alert, that is, the system can issue alert information to the user when the parameter information satisfies a condition of switching to the second input mode. The alert information can be "Whether to switch to the conventional keyboard input mode" or "Whether to perform a responding operation", and then the system can determine whether to switch the input mode in response to a selection by the user.

Figure 4:
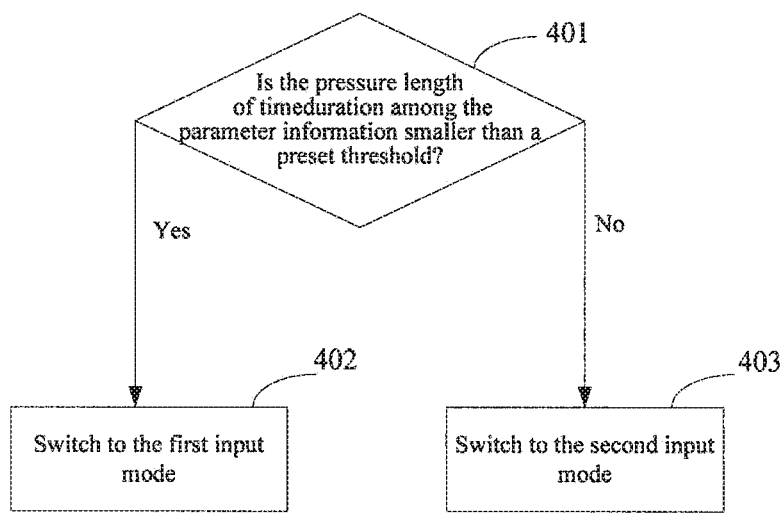
FIG. 4 is a flow chart of switching an input mode according to parameter information according to an embodiment of the application.

In an illustrative example, reference can be made to FIG. 4 for a particular process of the step 303. FIG. 4 is a flow chart of switching an input mode according to the parameter information according to an embodiment of the application. Referring to FIG. 4, the process for switching an input mode includes steps 401-403.

In step 401, it is judged whether the pressure duration among the parameter information is smaller than a preset threshold, and if so, then the flow proceeds to the step 402; otherwise, the flow proceeds to the step 403.

As can be appreciated, the user performing an input operation through the input apparatus will trigger a key on the input apparatus at a high rate, and if the user touches one or more keys on the touch screen on the input apparatus while handling the input apparatus, then he or she will make no action for a period of time. Thus, in this example, the pressure duration among the parameter information can be used as a criterion to judge which input mode the system shall be switched to. The system will be switched to a different input mode when the pressure duration among the parameter information is below or above the preset threshold.

In step 402, the touchable keyboard is switched to the first input mode.

The first input mode can be a conventional keyboard input mode. The touchable keyboard is switched to the conventional keyboard input mode when the pressure duration among the parameter information is smaller than the preset threshold.

In step 403, the touchable keyboard is switched to the second input mode.

The second input mode can be a keyboard input mode without any response. The touchable keyboard is switched to the keyboard input mode without any response, when the pressure duration among the parameter information is larger than the preset threshold.

Of course the application will not be limited to any criterion to judge switching the touchable keyboard to the first input mode or the second input mode. In order to ensure the accuracy of a switching result, it can be prescribed that the touchable keyboard is switched to the first input mode when among the parameter information, the pressure value is larger than a first preset threshold, the pressure duration is smaller than a second preset threshold, and the pressure increment/decrement rate is smaller than a third preset threshold; or that the touchable keyboard is switched to the second input mode when among the parameter information, the pressure value is smaller than a first preset threshold, the pressure duration is larger than a second preset threshold, and the pressure increment/decrement rate is larger than a third preset threshold.

In this embodiment, the information processing method can parse the trigger information sent by the input apparatus for its corresponding parameter information and further switch the touchable keyboard to the first input mode or the second input mode according to the obtained parameter information. The information processing method enables the keyboard to judge a demand of the user automatically in response to the trigger information entered by the user and further control switching of the input mode of the keyboard in response to the demand of the user, thus greatly facilitating the use by the user and optimizing an experience of use by the user.

Figure 5:
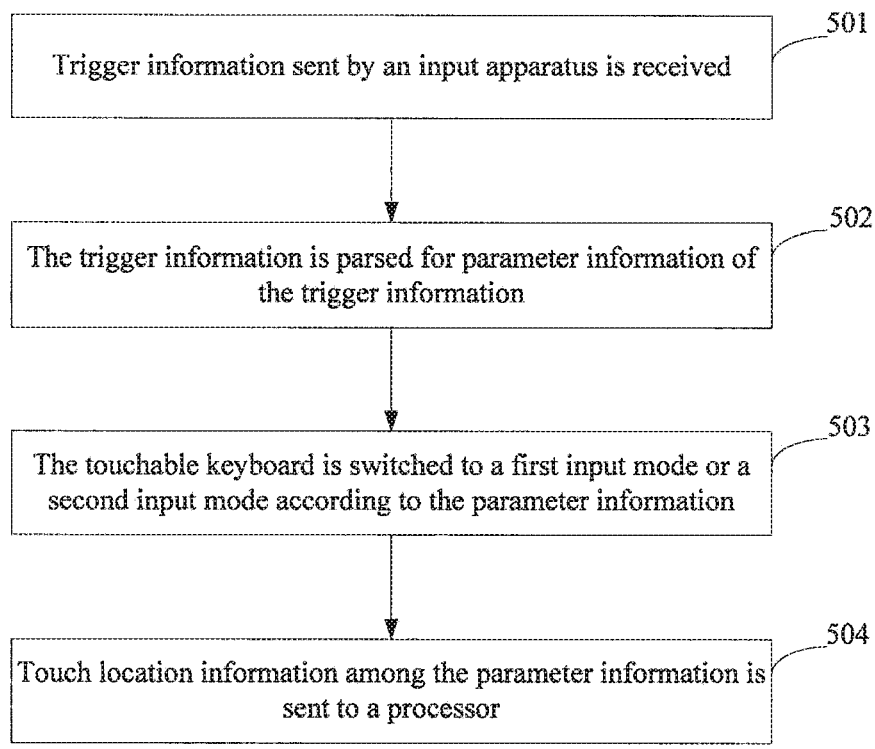
FIG. 5 is a flow chart of another information processing method according to an embodiment of the application.

FIG. 5 is a flow chart of another information processing method according to an embodiment of the application. The information processing method is applied to an electronic device with a touchable keyboard. Referring to FIG. 5, the information processing method can include steps 501-504.

In step 501, trigger information sent by an input apparatus is received.

In step 502, the trigger information is parsed for parameter information of the trigger information.

In step 503, the touchable keyboard is switched to a first input mode or a second input mode according to the parameter information.

In step 504, touch location information among the parameter information is sent to a processor, and then the processor responds to the trigger information according to a current application scenario.

In this embodiment, the information processing method can parse the trigger information sent by the input apparatus for its corresponding parameter information; switch the touchable keyboard to the first input mode or the second input mode according to the obtained parameter information; and further send the touch location information among the parameter information to the processor so that the processor responds to the trigger information according to the current application scenario. The information processing method enables the keyboard to judge a demand of the user automatically in response to the trigger information entered by the user and further control switching of the input mode of the keyboard in response to the demand of the user, thus greatly facilitating the use by the user and optimizing an experience of use by the user.

The method has been detailed above in the embodiments of the application described above, which can be performed in a variety of forms of apparatuses. Thus, the application further discloses an apparatus, particular embodiments of which will be detailed below.

Figure 6:
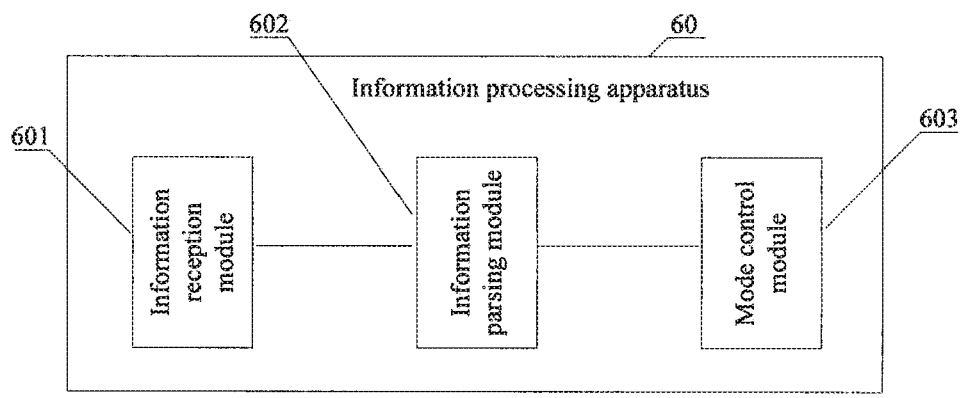
FIG. 6 is a schematic structural diagram of an information processing apparatus according to an embodiment of the application.

FIG. 6 is a schematic structural diagram of an information processing apparatus according to an embodiment of the application. The information processing apparatus is applied to an electronic device with a touchable keyboard. Referring to FIG. 6, the information processing apparatus may include an information reception module 601, an information parsing module 602, and a mode control module 603.

The information reception module 601 is configured to receive trigger information sent by an input apparatus.

The trigger information is generated by a sensing unit in the touchable keyboard in response to a detected operation of a user on the touchable keyboard. The sensing unit can include but will not be limited to a touch sensing unit and/or a pressure sensing unit.

An information parsing module 602 is configured to parse the trigger information for parameter information of the touch information.

The parameter information can include but will not be limited to touch location information, a pressure value, a pressure duration and/or pressure increment/decrement rate.

The mode control module 603 is configured to switch the touchable keyboard to a first input mode or a second input mode according to the parameter information.

The first input mode can be a conventional keyboard input mode. The second input mode can be a keyboard input mode without any response, that is, it does not respond to any operation triggered by the user on the input apparatus. Alternatively, the second input mode can be a keyboard input mode with a response alert, that is, the system can issue alert information to the user when the parameter information satisfies a condition of switching to the second input mode. The alert information can be "Whether to switch to the conventional keyboard input mode" or "Whether to perform a responding operation". Then, the system can determine whether to switch the input mode in response to a selection by the user.

Figure 7:
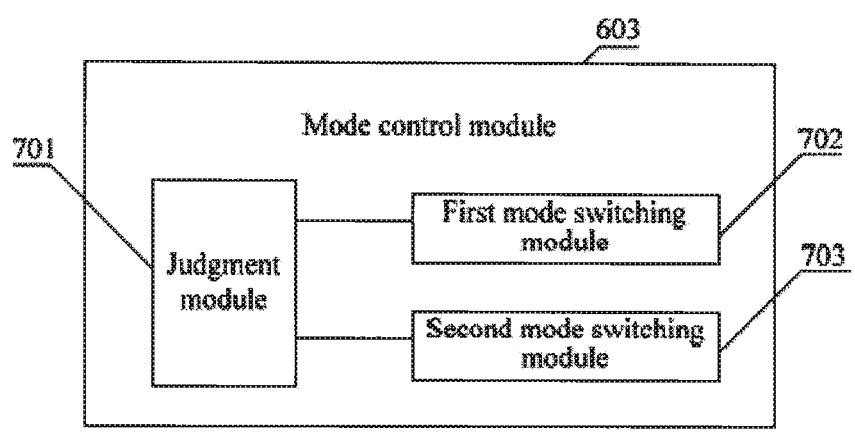
FIG. 7 is a schematic structural diagram of a mode control module according to an embodiment of the application.
Figure 8:
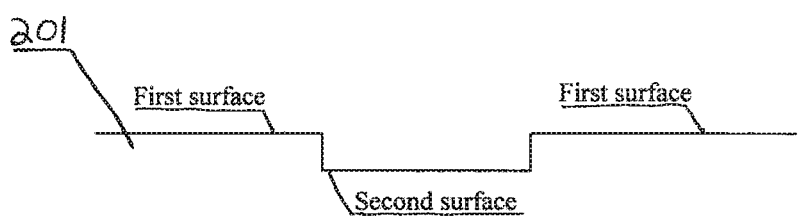
FIG. 8 is a schematic sectional diagram of a portion of an input apparatus according to an embodiment of the application.

In an illustrative example, reference can be made to FIG. 7 for a particular structure of the mode control module 603, and FIG. 7 is a schematic structural diagram of the mode control module according to an embodiment of the application. Referring to FIG. 7, the mode control module 603 includes a judgment unit 701, a first mode switching module 702, and a second mode switching module 703.

The judgment unit 701 is configured to judge whether among the parameter information, the pressure value is larger than a first preset threshold, the pressure duration is smaller than a second preset threshold, and the pressure increment/decrement rate is smaller than a third preset threshold.

The first mode switching module 702 is configured to switch the touchable keyboard to the first input mode when the pressure value is larger than a first preset threshold, the pressure duration is smaller than a second preset threshold, and the pressure increment/decrement rate is smaller than a third preset threshold.

The second mode switching module 703 is configured to switch the touchable keyboard to the second input mode when the pressure value is smaller than a first preset threshold, the pressure duration is larger than a second preset threshold, or the pressure increment/decrement rate is larger than a third preset threshold.

In this embodiment, the information processing apparatus can parse the trigger information sent by the input apparatus for its corresponding parameter information and further switch to the first input mode or the second input mode according to the obtained parameter information. The information processing apparatus enables the keyboard to judge a demand of the user automatically in response to the trigger information entered by the user and further control switching of the input mode of the keyboard in response to the demand of the user, thus greatly facilitating the use by the user and optimizing an experience of use by the user.

In another embodiment, besides the information reception module, the information parsing module and the mode control module, the information processing apparatus may further include an information sending module configured to send the touch location information among the parameter information to a processor. Then, the processor responds to the trigger information according to a current application scenario.

Furthermore, an embodiment of the application further discloses an electronic device with a touchable keyboard, and the electronic device includes the information processing apparatus disclosed according to the embodiment above. Since the electronic device includes the information processing apparatus according to the embodiment above, the electronic device can parse the trigger information sent by the input apparatus for its corresponding parameter information and further switch the touchable keyboard to the first input mode or the second input mode according to the obtained parameter information. Thus, the electronic device can judge a demand of the user automatically in response to the trigger information entered by the user and further control switching of the input mode of the keyboard in response to the demand of the user, thereby greatly facilitating the use by the user and optimizing an experience of use by the user.

The respective embodiments have been described progressively in this description, and each of the embodiments has been focused upon its difference(s) from the other embodiments, so reference can be made to each other for those identical or similar points among the respective embodiments. For the apparatus disclosed according to an embodiment, it corresponds to its method disclosed according to an embodiment, so the description thereof has been simplified, and reference can be made to the relevant disclosure of the method for their relevant points.

It shall be further noted that in this context, a relationship term, e.g., first, second or the like, is merely intended to distinguish an entity or operation from another entity or operation but not necessarily intended to require or suggest the presence of any such real relationship or order between these entities or operations. Moreover the term "include", "comprise" or "contain" or any variants thereof are intended to encompass non-excluding inclusion so that a process, a method, an article or a device including a series of elements include both those elements and other elements which have not been listed explicitly or elements inherent to the process, the method, the article or the device. Unless further defined, an element(s) defined in a sentence "including a/an . . . " will not preclude the presence of additional identical elements in a process, a method, an article or a device including the element(s).

The steps of the method or algorithm described in connection with the embodiments disclosed in this context can be performed directly in hardware, in a software module executed by a processor or in a combination of both. The software module can be arranged in a Random Access Memory (RAM), a memory, a Read-Only Memory (ROM), an Electrically Programmable ROM, an Electrically Erasable and Programmable ROM, a register, a hard disk, a mobile magnetic disk, a CD-ROM or a storage medium in any other form well known in the art.

The foregoing description of the disclosed embodiments enables those skilled in the art to make or use the application. Numerous modifications to these embodiments will be obvious to those skilled in the art, and the general principle as defined in this description can be put into practice in other embodiments without departing from the spirit and scope of the application. Accordingly the application will not be limited to these embodiments illustrated in this context but shall be accorded the broadcast scope consistent with the principle and novel characteristics disclosed in this context.

The invention claimed is:

1. An input apparatus, comprising:
a protection surface layer configured to protect an internal structure of the input apparatus, wherein the protection surface layer comprises a first surface at a first height and a second surface at a second height, and the first surface is at a top of the protection surface layer, and the first height is higher than the second height;
a sensing array, located below the protection surface layer, and configured to determine an operation of a user on the first surface and to generate first information; and
a processor configured to process the first information generated by the sensing array;
wherein the sensing array comprises a first sensing layer which is a capacitive touch sensing layer and a second sensing layer which is a pressure sensing layer,
wherein the processor is configured to input a character corresponding to an explicit function of a combinational function key directly on the input apparatus upon judging that an operation pressure value is below a preset value; and input another character corresponding to an implicit function of the combinational function key on the input apparatus upon judging the operation pressure value is above or at the preset value, when the user triggers the combinational function key,
wherein the processor is further configured to receive trigger information sent by the input apparatus; parse the trigger information for parameter information of touch information, wherein the parameter information includes at least one of touch location information, a pressure value, a pressure duration and/or pressure increment/decrement rate; and switch a touchable keyboard to a first input mode or a second input mode according to the parameter information, wherein the first input mode is a conventional keyboard input mode and the second input mode is a keyboard input mode without any response, and wherein the processor is further configured to switch the touchable keyboard to the first input mode when, among the parameter information, the pressure value is larger than a first preset threshold, the pressure duration is smaller than a second preset threshold, and the pressure increment/decrement rate is smaller than a third preset threshold; or switch the touchable keyboard to the second input mode when, among the parameter information, the pressure value is smaller than the first preset threshold, the pressure duration is larger than the second preset threshold, and the pressure increment/decrement rate is larger than the third preset threshold.

2. The input apparatus according to claim 1, wherein a height of the first sensing layer is higher than a height of the second sensing layer.

3. The input apparatus according to claim 2, wherein the first sensing layer is configured to generate touch sensing information according to a location of the operation of the user on the first surface; and the second sensing layer is configured to generate pressure sensing information according to a pressure of the operation of the user on the first surface.

4. The input apparatus according to claim 3, wherein the processor is further configured to process the pressure sensing information generated by the pressure sensing layer to obtain a pressure value of the operation of the user on the first surface.

5. The input apparatus according to claim 1, wherein: the processor is further configured to generate an instruction to alert the user of whether to perform an input operation, when the operation pressure value is smaller than the preset value; and generate directly an instruction to switch an input mode of the touchable keyboard when the operation pressure value is larger than or equal to the preset value.

6. An information processing method, wherein an internal structure of an input apparatus is protected by a protection surface layer, wherein the protection surface layer comprises a first surface at a first height and a second surface at a second height, and the first surface is at a top of the protection surface layer, and the first height is higher than the second height, the method comprising:

determining an operation of a user on the first surface by a sensing array located below the protection surface layer, and generating a first information, wherein the sensing array comprises a first sensing layer which is a capacitive touch sensing layer and a second sensing layer which is a pressure sensing layer;

processing the first information generated by the sensing array by a processor, wherein the processor inputs a character corresponding to an explicit function of a combinational function key directly on the input apparatus upon judging that an operation pressure value is below a preset value; and inputs another character corresponding to an implicit function of the combinational function key on the input apparatus upon judging the operation pressure value is above or at the preset value, when the user triggers the combinational function key;

receiving trigger information sent by the input apparatus;

parsing the trigger information for parameter information of touch information, wherein the parameter information includes at least one of touch location information, a pressure value, a pressure duration and/or pressure increment/decrement rate;

switching a touchable keyboard to a first input mode or a second input mode according to the parameter information, wherein the first input mode is a conventional keyboard input mode and the second input mode is a keyboard input mode without any response; and switching the touchable keyboard to the first input mode when among the parameter information, the pressure value is larger than a first preset threshold, the pressure duration is smaller than a second preset threshold, and the pressure increment/decrement rate is smaller than a third preset threshold; or switching the touchable keyboard to the second input mode when, among the parameter information, the pressure value is smaller than the first preset threshold, the pressure duration is larger than the second preset threshold, and the pressure increment/decrement rate is larger than the third preset threshold.

7. The information processing method according to claim 6, wherein a height of the first sensing layer is higher than a height of the second sensing layer.

8. The information processing method according to claim 6, wherein the method further comprises:

generating touch sensing information according to a location of the operation of the user on the first surface by the first sensing layer; and generating pressure sensing information according to a pressure of the operation of the user on the first surface by the second sensing layer.

9. The information processing method according to claim 8, wherein the method further comprises: processing the pressure sensing information generated by the pressure sensing layer to obtain a pressure value of the operation of the user on the first surface by the processor.

10. The information processing method according to claim 6, wherein the method further comprises: generating an instruction to alert the user of whether to perform an input operation when the operation pressure value is smaller than the preset value by the processor; and generating directly an instruction to switch an input mode of the touchable keyboard when the operation pressure value is larger than or equal to the preset value by the processor.

* * * * *